Figure 4:
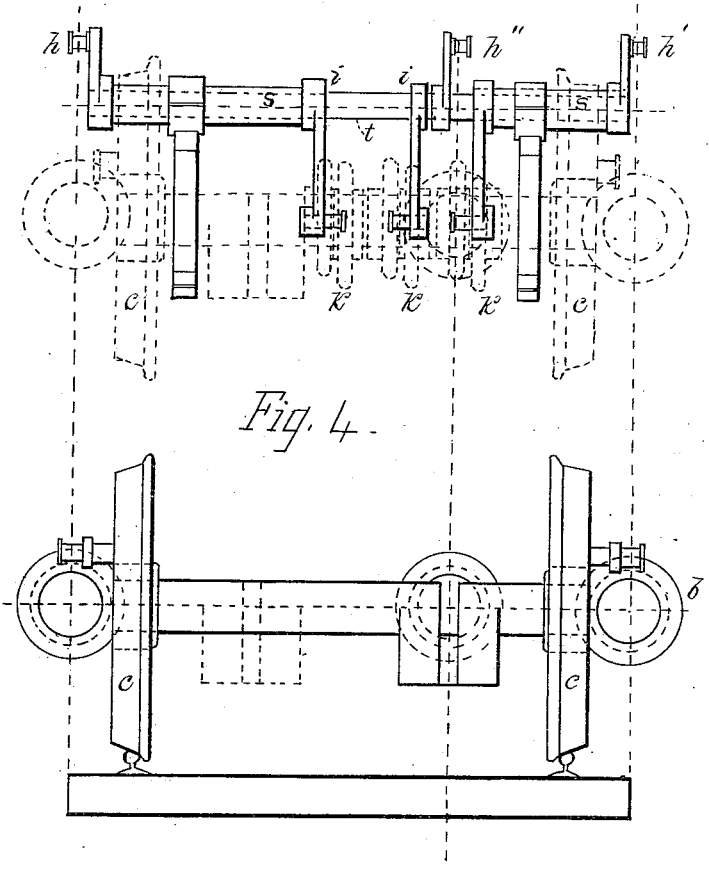

(No Model.) 4 Sheets—Sheet 1.
J. B. SMITH.
Locomotive.
No. 228,406. Patented June 1, 1880.
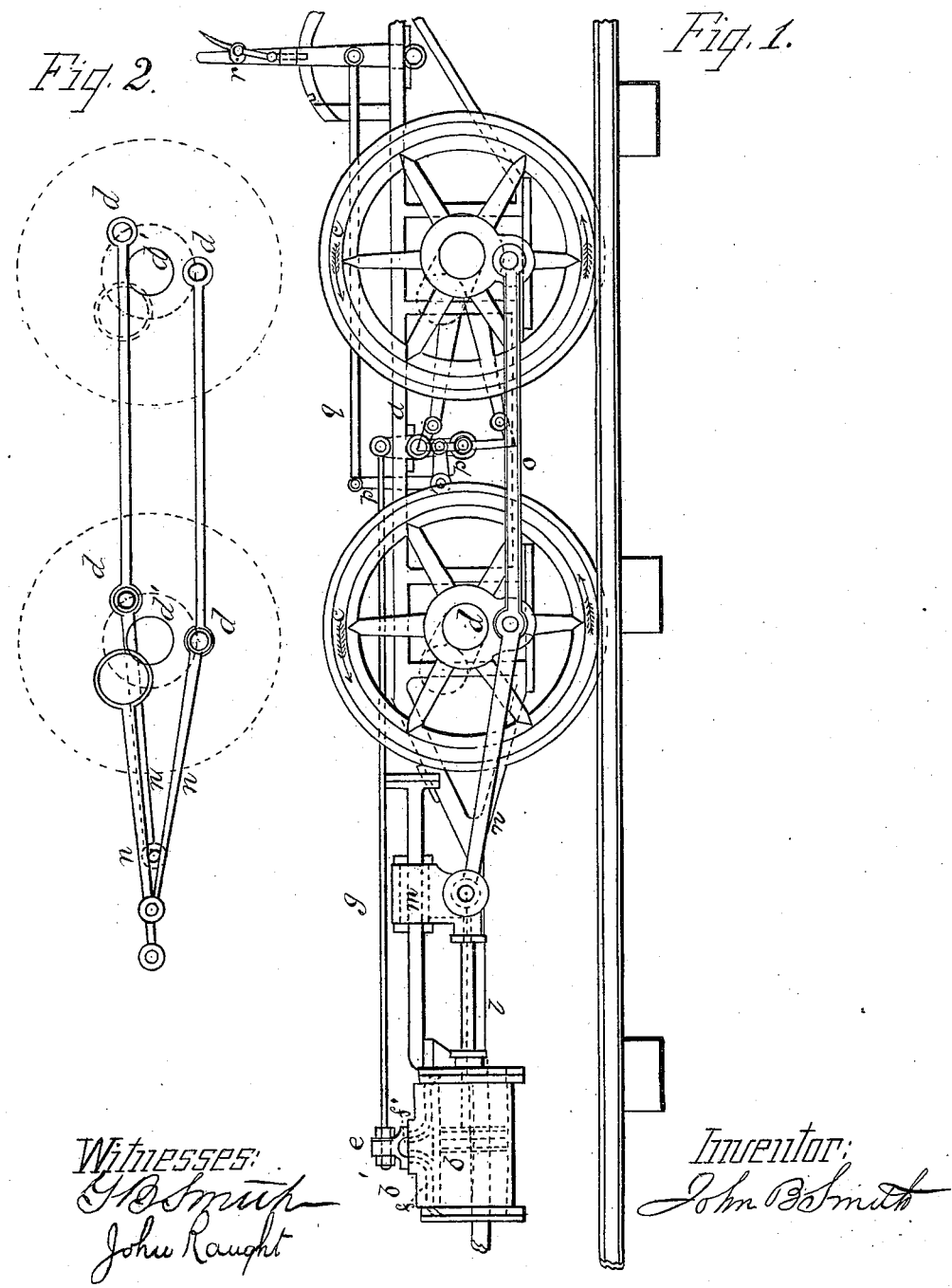

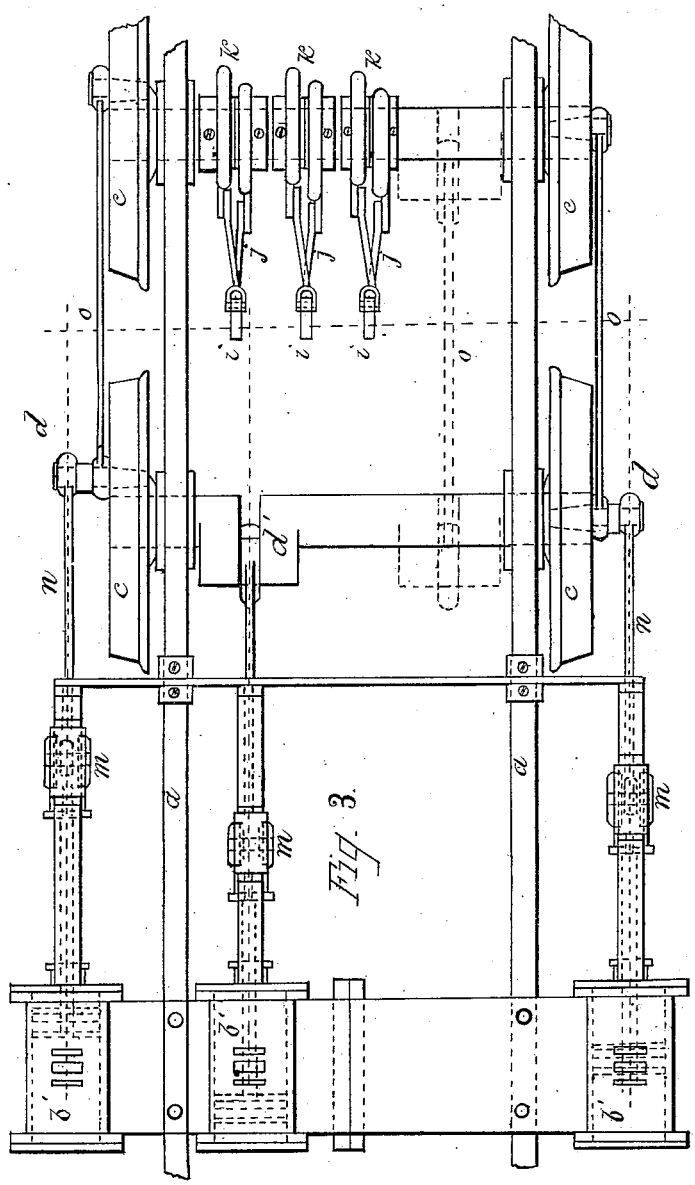

(No Model.)  4 Sheets—Sheet 3.

J. B. SMITH.
Locomotive.

No. 228,406.  Patented June 1, 1880.

Witnesses:  Inventor:

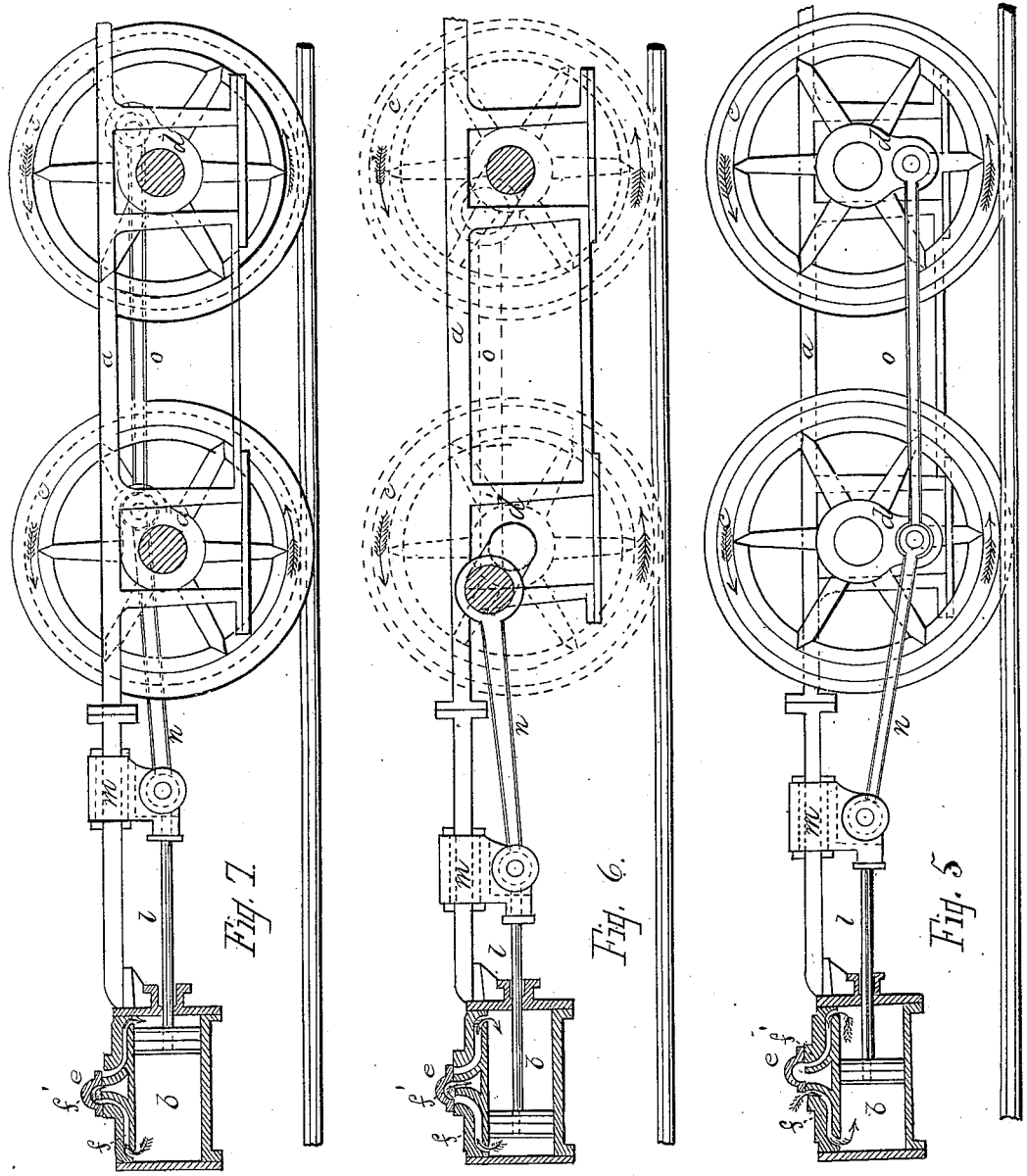

UNITED STATES PATENT OFFICE.

JOHN B. SMITH, OF DUNMORE, PENNSYLVANIA, ASSIGNOR OF ONE-HALF OF HIS RIGHT TO GEORGE B. SMITH, OF SAME PLACE.

LOCOMOTIVE.

SPECIFICATION forming part of Letters Patent No. 228,406, dated June 1, 1880.

Application filed April 1, 1880. (No model.)

*To all whom it may concern:*

Be it known that I, JOHN B. SMITH, of Dunmore, in the State of Pennsylvania, have invented a certain new and useful Improvement in Locomotives; and I do hereby declare the following to be a full, clear, and exact description of the same, reference being had to the accompanying drawings, forming a part of this specification.

My invention relates to a combination and arrangement, in a locomotive, of three piston-cylinders and their immediate connections with the ordinary slide-valve gear and reversing-gear, so that said piston-cylinders may be operated through and by means of such slide-valve gear and reversing-gear, thereby admitting steam to each end of each of the three cylinders in each revolution of the drive-wheel, to one end of the cylinders and then to the other end successively.

The object of this improvement is to produce a practical three-cylinder locomotive, so that lateral motion in the locomotive shall be overcome, thereby increasing the durability of the engine and the track upon which it runs, also causing the engine to run steadier and easier on steep grades, and to draw a longer or more heavily-freighted train.

In the drawings, Figure 1 is a side view of a locomotive containing my improvement. Fig. 2 shows the position of the crank-pins and crank-axles at thirds of a circle, the three cylinders being combined and arranged as hereinafter described. Fig. 3 is a plan, showing the three steam-cylinders with all the other mechanism arranged and combined as hereinafter described. Fig. 4 is an end view, showing the three steam-cylinders, wheels, crank-pins, crank-axle, eccentrics, stems, and shaft for valve-stem arms. Figs. 5, 6, and 7 each represent one position of each piston with slide-valves in position to admit steam for a forward movement of the engine.

$a$ is the frame of the locomotive. $b\ b\ b$ are the steam-cylinders; $b'\ b'\ b'$, steam-chests; $c\ c$, driving-wheels; $d\ d$, crank-pins on driving-wheels; $d'\ d'$, crank-axles, the crank-pins and crank-axles being arranged at thirds of a circle, or at angles to each other of about one hundred and twenty degrees, as shown in Figs. 5, 6, and 7; $e\ e\ e$, slide-valves; $f\ f\ f$, steam-ports; $f'\ f'\ f'$, exhaust-ports; $g\ g\ g$, valve-stems; $h\ h\ h$, arms for driving valve-stems; $i\ i\ i$, links; $j\ j\ j$, three pairs of eccentric-rods; $k\ k\ k$, three pairs of eccentrics for driving-valves; $l\ l\ l$, pistons; $m\ m\ m$, cross-heads; $n\ n\ n$, connecting-rods from the three pistons to driving-wheels and axles, two of these connecting-rods being connected to crank-pins $d\ d$ and one to crank-axles $d'$, (or all three may be connected inside to crank-axles;) $o\ o$, parallel rods; $p\ p$, link lift arms; $q$, reach-rod from link-arms to reversing-lever $r$; $s\ s$, sleeves for carrying arms $h\ h'$. $t$ is shaft for carrying arm $h''$.

The operation is as follows: The steam is admitted through pipes direct from throttle-valve to steam-chests $b'\ b'\ b'$. The steam passes from the three steam-chests through the three slide-valves $e\ e\ e$ into the three steam-cylinders, the slide-valves on the steam-cylinders being operated by three pairs of eccentrics, $k\ k\ k$, on the engine-axles $b\ b$ through the three pairs of eccentric-rods $j\ j\ j$ and three links, $i\ i\ i$, and so that the engine can be reversed in the ordinary manner of the "link-motion" connection.

The steam is admitted uniformly to the three cylinders through the three slide-valves $e\ e\ e$, and thereby gives steam to each cylinder twice in each revolution of the wheel—first to one end of all the cylinders and then to the other end of all the cylinders successively, and this on either a forward or backward movement of the machine.

The arrows in Figs. 5, 6, and 7 indicate the steam admitted to and exhausted from the pistons of the three cylinders on a forward movement of the engine.

I claim—

The combination, in a locomotive, of three piston-cylinders and their immediate connections with the slide-valve gear and reversing-gear, arranged in such manner that steam is admitted to each end of the three cylinders in each revolution, substantially as specified.

JOHN B. SMITH.

Witnesses:
G. W. SIMPSON,
N. W. WARNER.